Sept. 7, 1954   R. V. RHOADES ET AL   2,688,726
PHASE-AMPLITUDE-FREQUENCY MEASURING SYSTEM
Filed Jan. 11, 1951
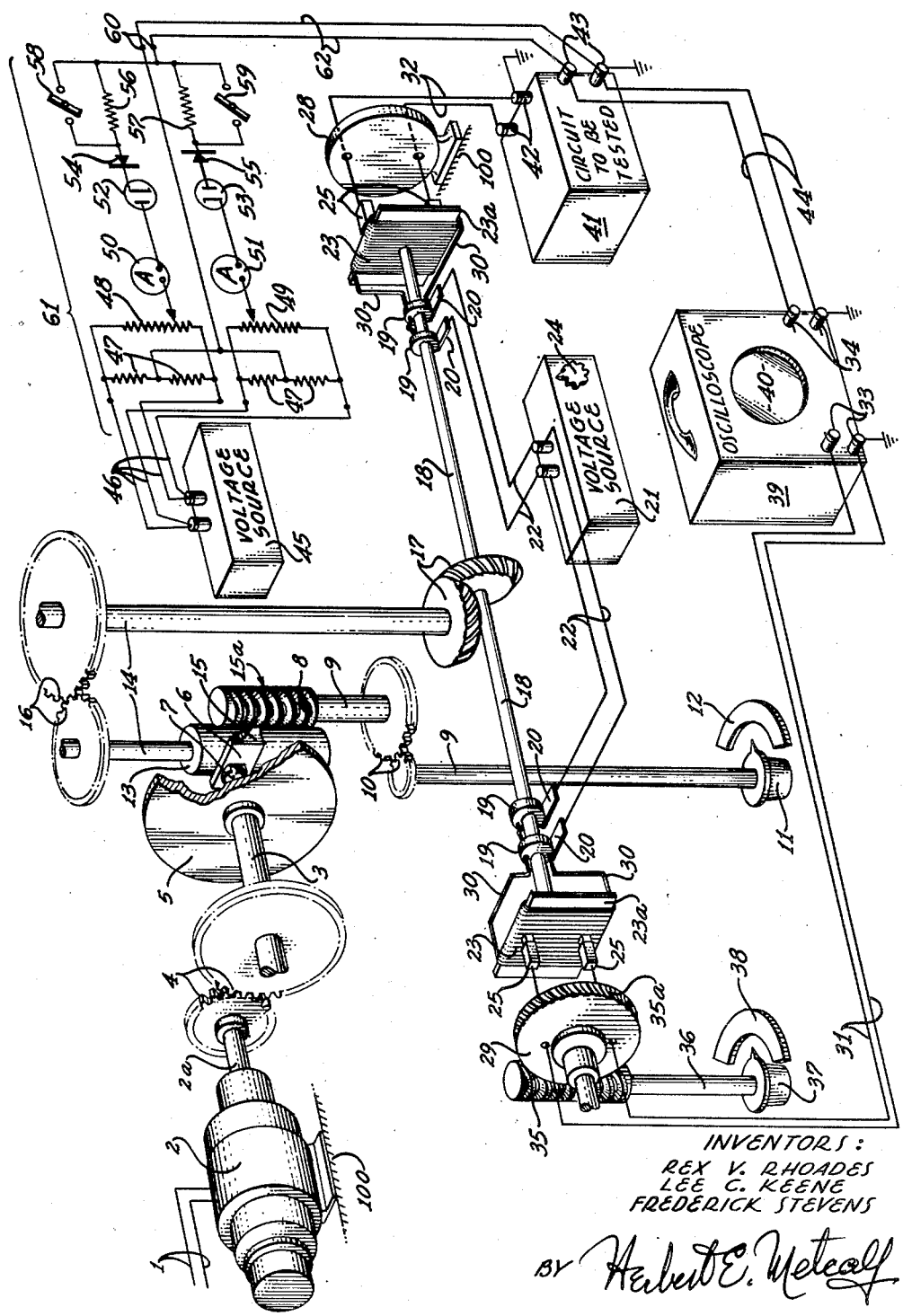
INVENTORS:
REX V. RHOADES
LEE C. KEENE
FREDERICK STEVENS
BY Herbert E. Metcalf
THEIR PATENT ATTORNEY Patented Sept. 7, 1954

2,688,726

UNITED STATES PATENT OFFICE 2,688,726

PHASE-AMPLITUDE-FREQUENCY MEASURING SYSTEM

Rex V. Rhoades, Redondo Beach, Lee C. Keene, Manhattan Beach, and Frederick Stevens, Long Beach, Calif., assignors to Northrop Aircraft, Inc., Hawthorne, Calif., a corporation of California Application January 11, 1951, Serial No. 205,542

5 Claims. (Cl. 324—57)

This invention relates to a phase-amplitude measuring device, and more particularly to a means and a method of detecting and measuring any change in phase and/or amplitude between the input and output of an electrical device.

It is known that many electrical devices, such as servomechanisms, electronic amplifiers, autopilot devices, and the like, display a shift in phase relationship, or a change in amplitude, or both, between an alternating signal voltage at the input to the device and the alternating voltage appearing at the output of the device. This phase shift and amplitude change vary with frequency of the applied input signal. It is often desirable to detect and measure the amount of phase shift that occurs in an electrical device and to detect and measure the ratio of amplitude between the input and the output alternating voltage.

The phase-amplitude measuring device is used to obtain sinusoidal responses of electro-mechanical systems, to obtain phase and amplitude ratios at various frequencies. These ratio measurements can then be used in designing controls, either by utilizing a Nyquist plot or a log-decibel plot.

It is, accordingly, an object of the present invention to provide a method and a means whereby a shift in phase between the alternating voltage input and output of an electrical device may be detected and measured, using input frequencies normally in the range of .01 to 2 C. P. S.

Another object of the present invention is to provide a method and a means whereby a difference of amplitude between the alternating voltage input and output may be detected and measured, since the overall gain of the device being tested at various frequencies is thus determined.

A further object of the present invention is to provide a method and a means whereby the frequency of the input voltage signals, as applied to the circuit to be tested, may be varied over a suitable range in order to obtain data on operating characteristics of the circuit under test at various conditions.

This invention possesses numerous other objects and features, some of which, together with the foregoing, will be set forth in the following description of a preferred embodiment of the invention.

Broadly stated, the present invention is comprised of alternating voltage generating devices and a phase and voltage amplitude measuring means. Two alternating voltages are generated whose amplitude, frequency, and phase relationship are known; one voltage traverses the circuit under test and then is compared to the other voltage to determine a shift in phase. The output voltage from the circuit under test is also compared to a voltage of known amplitude.

In the drawing, the figure is a perspective, diagrammatic illustration of the preferred embodiment of the invention together with a wiring diagram of certain parts thereof.

A constant frequency alternating voltage is applied to a synchronous motor 2 through motor leads 1. The motor 2 is mounted on a main support frame 100 of the measuring device, and has a rotor 2a rotatably connected to a disk 5 through drive gears 4 and drive shaft 3. A ball 7 is so disposed by a ball keeper 6 that it is always in contact with the surface of the disk 5 and the surface of a drum 13, to thereby provide a mechanical friction drive between the disk and the drum. A follower 15 on the edge of the ball keeper 6 engages a helical cut 15a on the surface of a cylindrical cam 8; therefore, rotation of the cylindrical cam 8 results in a translation motion of the ball keeper 6 and ball 7 such that the point of contact between the disk 5 and the ball 7 will trace a straight line from the center of the disk 5 to its rim, parallel to the axis of the drum 13. The rotation of the cylindrical cam 8 is realized by rotating a speed control knob 11, which is connected to cylindrical cam 8 by means of cam shafts 9 and cam gears 10.

The rotational output of the drum 13 is transmitted through drum shafts 14, drum gears 16, and two bevel gears 17 to a sinusoidal potentiometer shaft 18. Positioned on and rotating with the sinusoidal potentiometer shaft 18 are four slip rings 19 insulated from the shaft, and two sinusoidal potentiometer coil assemblies 23.

The sinusoidal potentiometer coils 23 are each energized by the voltage at the output of a first voltage source 21 (preferably D. C.) as follows: Source leads 22 connected to four stationary brushes 20, which bear respectively on the slip rings 19, and potentiometer leads 30 connected between each slip ring 19 and opposite ends of its respective potentiometer coil 23, afford a means whereby a continuous electrical circuit is maintained between the output of the first voltage source 21 and the rotating coils 23 of the sinusodial potentiometers. A means, such as rheostat knob 24, is provided within first voltage source 21 to vary the input voltage applied to coils 23. This voltage varying means is so calibrated that the amplitude of the alternating voltage at the potentiometer output can be selected over a wide, known range of values.

Each coil 23 consists of a comparatively high resistance wire wound in a linear fashion on a stiff card coil form 23a. The coil wire is normally insulated, but the insulation is removed from one, exposed, face of the coil in order that a pair of brushes 25 may make an electrical contact with each coil.

The brushes 25 are positioned equi-distantly apart and are so located that they are in contact with the coil 23 and trace a circular path on the coil 23 as the coil rotates. One sinusoidal potentiometer brush-holder 28 is permanently attached to the frame 100 of the device. Another sinusoidal potentiometer brush-holder 29 is capable of being rotated about an axis parallel to the potentiometer shaft 18 by rotation of a phase control knob 37, brush-holder shaft 36, and worm 35.

The thread of the worm 35 meshes with worm gear teeth 35a on the periphery of the rotatable brush-holder 29 such that a rotation of phase control knob 37 is transmitted to worm 35 through brush-holder shaft 36 and thereafter causes a rotational motion of the movable sinusoidal potentiometer brush-holder 29 about an axis perpendicular to the axis of rotation of the worm 35 and coaxial with potentiometer shaft 18.

Output leads 31 from the brushes 25 of the movable brush-holder 29 are applied to one deflection circuit of an oscilloscope 39, such as through horizontal input 33, for example. The output of brushes 25 of the fixed brush-holder 28 is applied to a circuit to be tested 41 through test circuit input leads 32 to the test circuit input 42. A test circuit output at 43 is taken from the circuit to be tested 41 and is applied to the other deflecting circuit of oscilloscope 39 through vertical input 34 by means of test circuit output leads 44. Another output is taken from the circuit to be tested 41 at output 43 and is applied to input connections 60 of a pair of slide-back voltmeters 61 through voltmeter leads 62.

A second voltage source 45 applies a known D. C. voltage to the slide-back voltmeter assembly 61 through wires 46. Center-output resistors 47 effectively ground the center of potentiometers 48 and 49. By grounding the center of potentiometers 48 and 49 the reversing of voltmeter leads 62 at the input connections 60 of the slide-back voltmeter assembly 61 to obtain the correct positive and negative peak voltage reading on voltmeters 61 is obviated, since the movable contact of the potentiometers 48 and 49 may be moved from a zero-reading central position to values in either direction. The movable contact on potentiometers 48 and 49 can be adjusted until the voltage at the movable contact matches the voltage at the input 60, which will be indicated by no current flowing through ammeters 50 and 51. The diode combinations 52 and 54 and the diode combinations 53 and 55 provide a sharp rectification of the input voltage at 60, thereby enabling the ammeter 50, for example, to detect the negative peak voltage and the ammeter 51 to detect the positive peak voltage of the output of the circuit to be tested 41. The resistor-switch combinations 56 and 58 and the resistor-switch combinations 57 and 59 provide a meter protection and a sensitivity means for the voltmeters in that the initial readings of the ammeters 50 and 51 are made with the resistors 56 and 57 in their respective circuits, then the resistors are short circuited by closing switches 58 and 59 to obtain a more precise measurement.

Assume that the circuit to be tested, 41, has been selected and that its test frequency and input voltage are established. The speed control knob 11 is then adjusted until its pointer matches the desired frequency, as indicated on a frequency scale 12. In adjusting control knob 11, the cylindrical cam 8 is rotated to thereby translate ball keeper 6 and ball 7 along a path parallel to the axis of drum 13 to a new position with respect to the center of the disk 5. The synchronous motor 2 is energized by applying power to motor leads 1 and torque is applied from the motor 2 to the coils 23 of the sinusoidal potentiometers by means of shafts 3, 14 and 18, gears 4, 16 and 17, and by means of the ball and disk speed-changer. The coil assemblies 23 of the sinusoidal potentiometers are then rotating at a speed as determined by the ball and disk speed-changer such that the desired frequency of the alternating voltage appearing at the output leads 31 and test circuit input leads 32 for operating the circuit to be tested 41 is obtained.

The sinusoidal potentiometers are disposed within this particular embodiment such that when the pointer of phase control knob 37 is set opposite zero phase shift on a phase scale 38 and when the two coil assemblies 23 are energized and rotating, the alternating voltage outputs through leads 32 and 31 are in phase. The only means whereby a difference of phase can be realized between leads 31 and 32 is by a rotation of the sinusoidal potentiometer brush-holder 29 and the brushes attached thereto with respect to the sinusoidal potentiometer brush-holder 28. The phase scale 38 has calibrated markings so positioned thereon that a reading between the pointer of phase control knob 37 and scale 38 affords a measure of the phase relationship existing between the alternating voltage in leads 31 and leads 32.

The output voltage from leads 31 is applied directly to one pair of deflection plates of oscilloscope 39 while the output voltage from leads 32 is applied to the circuit to be tested 41 from which an output voltage is taken to be applied to the other pair of deflection plates of oscilloscope 39. Thus, assuming the frequency of the alternating voltage is not altered in traversing the circuit under test 41, i. e., the frequencies at inputs 33 and 34 of oscilloscope 39 are identical, the Lissajou pattern appearing on screen 40 of oscilloscope 39 will be an ellipse with circles and straight lines as limiting conditions. If the input alternating voltages that are applied to oscilloscope 39 at inputs 33 and 34 are in phase or are 180° out of phase, a straight line Lissajou pattern will appear on screen 40; the straight line for the in phase condition being distinguishable from the 180° out of phase condition by the difference of direction it makes on the screen 40. The direction of the in phase straight line on the oscilloscope screen 40 may be quickly determined by eliminating oscilloscope input leads 44 and making a direct connection between the output of leads 32 and the input to oscilloscope 39 at 34.

When the circuit to be tested 41 produces a phase shift in the alternating voltage between its input 42 and its output 43 an elliptical Lissajou pattern will appear on screen 40. If the length of the minor axis of the ellipse equals the length of the major axis, i. e., a circle, then the phase shift has been equal to 90°.

In order to determine whether a leading or lagging phase shift is occurring in the circuit to be tested, a rough calculation of the phase shift may be made prior to utilizing the present invention to determine the phase shift. The rough calculation of the phase shift may be made for the circuit to be tested by using a frequency such that the calculations are made easy. The method of operation is then to adjust speed control knob 11 until the pointer matches the value of the frequency of the calculations on the frequency scale 12, then readjust speed control knob 11 until the pointer matches the frequency of desired operation on the scale 12, meanwhile carefully noting the characteristic of the change of the Lissajou pattern on the screen 40 to obtain the change of phase shift between the frequency of the calculations and the frequency of desired operation. By adjusting the phase control knob 37 until the trace area on the oscilloscope screen 40 is reduced to zero at the position indicating an "in phase" condition of the voltages in leads 31 and 44, the phase shift, caused in the test circuit 41 at the particular control frequency being applied, can be read directly from the calibrated phase scale 38.

Initially, the switches 58 and 59 of the slide-back voltmeter assembly 61 are open. The sliding contacts of the potentiometers 48 and 49 are then adjusted until no current is flowing through ammeters 50 and 51. The condition of no current flowing in ammeters 50 and 51 denotes that the voltage at the sliding contacts in potentiometers 48 and 49 equals the voltage of the positive and the negative peaks of the alternating voltage at the input 60. Calibrated scales (not shown) in conjunction with control knobs rotatably connected to the sliding contacts of potentiometers 48 and 49 operate to give a visual indication of the value of the peak negative and positive voltages at input 60 with respect to ground. Switches 58 and 59 are then closed, thereby short circuiting meter protector resistors 56 and 57 and increasing the accuracy of measurement of the peak voltages. The sliding contacts are readjusted until a no-current flow condition again exists in the ammeters 50 and 51, to give a final value for the peak voltages. The peak-to-peak amplitude of the alternating voltage at the circuit output 43 is then obtainable from the positive and negative peak voltages. The ratio of output to input voltage of the circuit to be tested 41 is then obtained by comparing the output amplitude determined above with the amplitude at the circuit input 42, the latter being a known value since the input voltage to the potentiometer coils 23 is known.

Thus it is seen that the present invention provides a means of quickly obtaining the phase shift and voltage gain of an electrical network. At the low frequencies for which this invention is best suited, the accuracies attainable are within ±0.2 degree in phase shift determination, and within 0.5% of the input voltage in the amplitude gain determination. Test frequencies can be set with an accuracy of 0.2%. While specifically adapted for low frequency work, this invention may be used at other, higher frequencies, or any number of variations in the basic method may easily be made, as will be obvious to those persons skilled in the art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In a phase-shift determining system for low frequency applications, means for generating a pair of phase-shifted alternating voltages comprising a voltage source, a rotatable rigid shaft, driving means for rotating said shaft, a pair of sinusoidal potentiometer coils fixed to said shaft, sliding contact means electrically connecting said potentiometer coils across said voltage source, a first pair of potentiometer pick-off brushes arranged at the end of one potentiometer coil to slidably bear against said coil and trace a closed path thereon as said coils rotate, a stationary brush holder holding said first pair of brushes fixed, a second pair of potentiometer brushes arranged at the end of the other potentiometer coil to slidably bear against said other coil and trace a closed path thereon as said coils rotate, a rotatable brush holder carrying said second pair of brushes, means for adjusting said rotatable brush holder about the center line of said shaft, means for connecting a first output circuit to said first pair of brushes, and means for connecting a second output circuit to said second pair of brushes, whereby measurable phase shift can be made between the waveforms in said output circuits without affecting the relative amplitude or purity of said waveforms.

2. Apparatus in accordance with claim 1 wherein said driving means comprises a constant speed motor, continuously variable speed changing means connected between said motor and said shaft, and a calibrated control element operatively connected to said speed changing means, the calibrations of said control element registering the frequency in said first and second output circuits as produced by rotation of said sinusoidal potentiometer coils.

3. Apparatus in accordance with claim 2 wherein said continuously variable speed changing means comprises a ball and disc integrator type adjustable transmission, including a cylinder in driven relationship with the ball, whereby very low shaft speeds are obtained to produce accurate stable output frequencies in the neighborhood of .01 C. P. S. to 2 C. P. S.

4. Apparatus in accordance with claim 1 wherein said potentiometer coils are identical and are connected in parallel with each other across said voltage source, whereby said waveforms are respectively equal in amplitude.

5. Apparatus in accordance with claim 1 including phase changing and indicating means which comprises a calibrated manual control member directly connected to move said rotatable brush-holder to turn said second pair of brushes relative to said first pair of brushes, the calibrations on said control member registering zero when the voltage of said second output circuit is in phase with the voltage of said first output circuit as said shaft is rotated.

References Cited in the file of this patent

UNITED STATES PATENTS

| Number | Name | Date |
| --- | --- | --- |
| 1,936,796 | Legg | Nov. 28, 1933 |
| 2,151,917 | Hyland | Mar. 28, 1939 |
| 2,193,079 | Schrader | Mar. 12, 1940 |
| 2,203,750 | Sherman | June 11, 1940 |
| 2,233,751 | Seeley | Mar. 4, 1941 |
| 2,243,234 | Von Duhn | May 27, 1941 |
| 2,297,393 | Deserno | Sept. 29, 1942 |
| 2,297,436 | Scholz | Sept. 29, 1942 |
| 2,557,798 | Reitz, Jr. | June 19, 1951 |
| 2,595,263 | Ingalls | May 6, 1952 |